United States Patent [19]

Nagasaka

[11] Patent Number: 4,794,290
[45] Date of Patent: Dec. 27, 1988

[54] STRUCTURE OF ACTIVE TYPE MAGNETIC BEARING

[75] Inventor: Nagahiko Nagasaka, Iruma, Japan

[73] Assignee: Kabushiki Kaisha Yaskawa Denki Seisakusho, Fukuoka, Japan

[21] Appl. No.: 76,591

[22] Filed: Jul. 23, 1987

Related U.S. Application Data

[63] Continuation-in-part of Ser. No. 810,065, Dec. 17, 1985, abandoned.

[30] Foreign Application Priority Data

Jan. 28, 1985 [JP] Japan .................................. 60-12577

[51] Int. Cl.$^4$ ............................................. F16C 39/06
[52] U.S. Cl. .................................................. 310/90.5
[58] Field of Search ....................................... 310/90.5

[56] References Cited

U.S. PATENT DOCUMENTS

| | | | |
|---|---|---|---|
| 3,845,997 | 11/1974 | Boden | 310/90.5 |
| 4,141,604 | 2/1979 | Habermann | 310/90.5 |
| 4,500,142 | 2/1985 | Brunet | 310/90.5 |

FOREIGN PATENT DOCUMENTS

| | | |
|---|---|---|
| 2213465 | 3/1972 | Fed. Rep. of Germany . |
| 2656469 | 6/1978 | Fed. Rep. of Germany ..... 310/90.5 |
| 0091858 | 5/1985 | Japan . |
| 0883884 | 12/1961 | United Kingdom . |

Primary Examiner—R. Skudy
Attorney, Agent, or Firm—Ladas & Parry

[57] ABSTRACT

An active type magnetic bearing for controllably supporting a rotatable shaft made of a magnetic material is constructed such that a stator made of an annular formed laminated iron core is provided around the rotatable shaft, a number of slots are formed along an internal surface of the iron core, stator windings of a number of phases are wound so as to be settled in the slots, thin sheet-like permanent magnets magnetized radially to provide a number of poles are secured onto the internal surface of the annular formed iron core with a predetermined air gap maintained between the permanent magnets and the rotatable shaft, and the stator windings of each phase are so wound that upon energization, a magnetic field thereby produced enhances a magnetic field produced by one of the permanent magnets while it reduces a magnetic field produced by another permanent magnet provided at a position 180° spaced apart from that one of the permanent magnets.

1 Claim, 2 Drawing Sheets

| | CASE | 1 | 2 | 3 | 4 | 5 | 6 |
|---|---|---|---|---|---|---|---|
| PHASE | U | + | − | − | − | + | + |
| | V | − | − | + | + | + | − |
| | W | + | + | + | − | − | − |
| MAGNETIC POLE | A' | ○ | X | ※ | X | ○ | ⊘ |
| | B | ⊘ | ○ | X | ※ | X | ○ |
| | C' | ○ | ⊘ | ○ | X | ※ | X |
| | A | X | ○ | ⊘ | ○ | X | ※ |
| | B' | ※ | X | ○ | ⊘ | ○ | X |
| | C | X | ※ | X | ○ | ⊘ | ○ |

STRUCTURE OF ACTIVE TYPE MAGNETIC BEARING

CROSS REFERENCE TO RELATED APPLICATION

This application is a continuation-in-part of a copending application Ser. No. 810,065, filed Dec. 17, 1985, now abandoned.

BACKGROUND OF THE INVENTION

1. Technical Field of the Invention

This invention relates to an active type magnetic bearing adapted to support a magnetic shaft rotatably.

2. Description of Prior Art

A magnetic bearing of the aforementioned type has been disclosed in U.S. Pat. No. 3,845,997 which was granted to Karl Boden, Nov. 5, 1974, and also in German Patent DE No. 2,213,465 also granted to Karl Boden. Although in the former, an attracting force created in the radial direction is controlled by superposing a magnetic field produced by a heteropolar electromagnet over a radial magnetic field (bias flux) produced by an annular permanent magnet, the construction of the magnetic path is not efficient. Likewise, in the German Patent is disclosed a construction having two sets of series connected coils wound around the circumference of a troidal magnetic core. However, the magnetic reluctance thereof becomes large and hence the efficiency of the magnetic field is not high.

SUMMARY OF THE INVENTION

A primary object of the present invention is to provide an active type magnetic bearing wherein the above described difficulties of the conventional constructions can be substantially eliminated.

Another object of the invention is to provide an active type magnetic bearing wherein magnetic fluxes produced by the electromagnet in a superposing manner are substantially minimized, thus reducing the magnetizing current regardless of maintaining a high rigidity of support.

Still another object of the invention is to provide an active type magnetic bearing wherein the controllability of support is substantially improved without the sacrifice of an increase in the eddy current loss, and the size of the bearing is substantially reduced, while the construction thereof is simplified.

These and other objects of the present invention can be achieved by an active type magnetic bearing of a type wherein a controllable magnetic field produced by an electromagnet is superposed on a magnetic field produced by a permanent magnet, thereby supporting a rotating shaft made of a magnetic material controllably, the bearing comprising a stator having a plurality of slots formed along an internal surface thereof, a plurality of windings inserted into the slots so as to provide a number of electromagnetic poles in the stator, a number of thin, sheet-like permanent magnets secured separately on the internal surface of the electromagnetic poles, and a rotating shaft made of a magnetic material provided within the electromagnetic poles, with an air gap.

The afore-mentioned stator is made of a laminated iron core, and the plurality of windings inserted in the slots are formed into two phase or three phase windings.

DESCRIPTION OF THE PREFERRED EMBODIMENTS

Figures 1, 3:
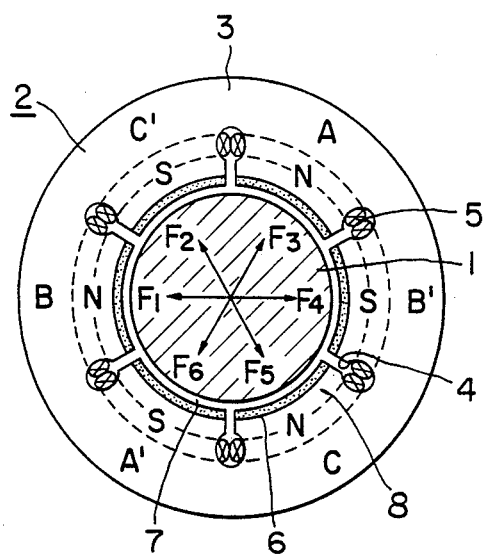
FIG. 1 is a front view, partly in section, of a preferred embodiment of the invention.
FIG. 3 is a table for explaining the condition of magnetic poles when a current flows through each phase of the excitation windings.

According to the present invention, permanent magnets are additionally used in the stator, for instance, like a STERO motor (which is disclosed in British Pat. No. 883,884, and its technical term is Hypocycloidal motor) or a salient pole type inductor machine, and a displacement of a rotating shaft made of a magnetic material is eliminated by an electromagnetic force created by the resultant magnetic field.

The basic construction of this invention is similar to that disclosed in my pending Japanese Patent Application No. 197,038 which was filed Oct. 21, 1983 under the title of "electromagnetic driving device using permanent magnets", now Japanese Pat. No. 60-91,858. Alike the afore-mentioned Patent Application, the stator windings of this invention are wound in the form of a simple polyphase concentrated windings.

A preferred embodiment of the invention will now be described with reference to FIG. 1.

A stator 2 of a cylindrical configuration surrounding a rotating shaft 1 is made of a laminated iron core 3 provided with six slots 4 along the internal surface thereof as in the case of an electric motor. Stator windings 5 are inserted into the slots 4 and configured in three phases. Thin, sheet-like permanent magnets 6 polarized radially into six magnetic poles which are arranged to be shifted 60 degrees from each other are secured to the internal surface of the electromagnetic poles 8. The magnets, configured as pole-pairs, are arranged at a position 180 degrees spaced apart from each other relative to the rotating shaft 1 with an air gap 7.

Figure 2:
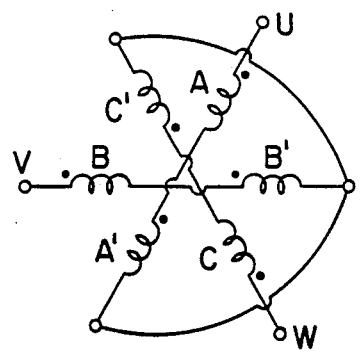
FIG. 2 is a diagram showing the connection of excitation windings used in the embodiment shown in FIG. 1.

FIG. 2 illustrates the connection of the stator windings 5. As shown in the drawing, winding coils A and A' are connected in series to be formed into U-phase winding, winding coils B and B' are connected in series to be formed into V-phase winding, and winding coils C and C' are connected in series to be formed into W-phase winding.

The dot mark • shown in the drawing indicates a start-winding end of each symmetrically wound coil of U-, V- and W-phase windings that are connected in the shown example in a star connection. When the coils of the U-, V- and W-phase windings are excited properly, the magnetic field in some of the electromagnet poles is intensified while the magnetic field in other electromagnet poles 8 spaced apart by 180° from the afore-mentioned poles is reduced.

FIG. 3 illustrates operating conditions of the preferred embodiment of the invention. When the U-, V- and W-phase windings are energized as shown in the middle part of FIG. 3, the intensified part of the magnetic field is shifted as shown in the lower part of FIG.

3. In this drawing, + mark designates a current of positive polarity, − mark designates a current of negative polarity, O mark designates intensifying of the magnetic field, ⊘ mark designates the strongest position of the magnetic field, X mark designates reduced magnetic field, and XX mark designates the weakest position of the magnetic field. The shaft 1 is attracted to the intensely magnetized position of the stator in one direction.

The upper part of FIG. 3 illustrates exciting conditions of U-, V- and W-phase windings. In a case 1, a DC current of positive polarity is caused to flow through the U-phase and W-phase windings, while a DC current of negative polarity is caused to flow through the V-phase winding. In this case, in the pole A' the magnetic field $\Phi_A$ produced by the coil A' is reduced by the bias magnetic field $\Phi_b$ produced by the permanent magnet piece 6, thus providing a magnetic field $\Phi_A - \Phi_b$ which is expressed by the mark O. On the other hand, in the pole B, the magnetic field $\Phi_B$ produced by the coil B ($\Phi_B = \Phi_A$) is superposed by the bias magnetic field $\Phi_b$ produced by the permanent magnet piece 6, thus providing a magnetic field $\Phi_B + \Phi_b$ ($= \Phi_A + \Phi_b$) expressed by the mark ⊘ in the lower part of FIG. 3. Likewise in the pole C', the magnetic field $\Phi_C$ produced by the coil C' ($\Phi_C = \Phi_A$) is reduced by the bias magnetic field $\Phi_b$ produced by the permanent magnet piece 6, thus providing a magnetic field $\Phi_C - \Phi_b$ also expressed by the mark O.

On the other hand, in the poles A, B' and C, magnetic fields $\Phi_b - \Phi_A$, $-\Phi_b - \Phi_B$ and $\Phi_b - \Phi_C$, expressed by the marks X, XX and X in the lower part of FIG. 3, respectively, are provided. As a consequence, an attracting force $F_1$ shown in FIG. 1 is applied to the shaft 1.

In the cases 2 to 6, similar results as in the case 1 are obtained, and attracting forces $F_2$ to $F_6$ as shown in FIG. 1 are applied to the shaft.

Although it is not indicated in the drawing, a stopper or else which can maintain a predetermined gap is provided in the bearing for avoiding contact of the shaft 1 with the permanent magnet even in the case of initially starting condition of the bearing.

Furthermore, a gap detecting device and a gap controlling device (both not shown in the drawing) may otherwise be provided, and each time when the gap detecting device detects a deviation in the gap, the gap controlling device may be operated to control the excitation of the A to C phase coils such that the shaft 1 is set back by the attracting forces $F_1 \sim F_6$ and constantly maintained at its normal position.

Figure 4:
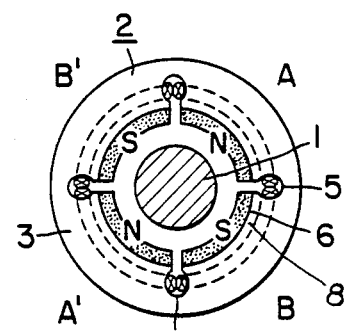
FIG. 4 is a front view, partly in section, of another embodiment of the invention.
Figure 5:
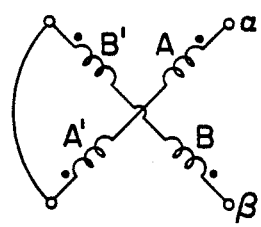
FIG. 5 is a diagram showing the connection of excitation windings used in the embodiment shown in FIG. 4.

FIG. 4 illustrates another embodiment of the invention wherein four slots 4 are provided in the core 3, and stator windings 5 formed into two phases (viz. $\alpha$ phase and $\beta$ phase) are inserted in the slots 4 and connected as shown in FIG. 5. In this case, a permanent magnet 6 of four poles are secured to the internal surface of the laminated core 3. Although the construction of this embodiment is slightly different from the aforementioned embodiment, it is apparent that the embodiment shown in FIGS. 4 and 5 is operable in the similar manner with the embodiment shown in FIGS. 1 through 3.

Although the invention has been described with respect to the preferred embodiments, it is apparent that various alterations and modifications may also be carried out as follows.

For instance, either of a laminated core or a magnetic material having a high specific resistance, may be provided on the surface of the rotating shaft 1, so that eddy-current loss and the delay of the magnetic field due to the eddy current, are eliminated, and the response property of the magnetic bearing is thereby improved.

According to the present invention, so small number of slots are provided, that the size of the slots and the cross-sectional area of a core can be increased. The ampere-turn of the stator windings is thus increased, and a sufficient intensity of attracting force is thereby provided regardless of a small diameter of the rotating shaft 1.

Since permanent magnets are provided in the stator, an attracting force proportional to the energizing current is exerted to the rotating shaft 1, and the control of the intensity of the attracting force is easily facilitated because of the linear force-current characteristics.

Furthermore, the power factor of the magnetic bearing can be improved, while the size thereof is reduced.

What is claimed is:

1. An active type magnetic bearing comprising a controllably and radially supported rotatable shaft made of a magnetic material, the bearing being configured in a plurality of electromagnetic poles secured in an annular stator core including a plurality of slots made of laminated magnetic material surrounding said rotatable shaft and multi-phase exciting windings secured in said stator core, including:

thin sheet-like permanent magnets secured to internal surfaces of said electromagnetic poles opposing said rotatable shaft, and magnetized in radial direction such that the magnets secured to two adjacent electromagnetic poles are polarized oppositely; and each phase of said exciting windings are connected in series and wound such that, when the phase windings are energized selectively by a DC current, a pair of said electromagnetic poles located at 180 degrees spaced apart positions are polarized into the same polarity, and cooperate with a bias magnetic field produced by a corresponding one of said permanent magnets so as to attract said shaft to set back said shaft in normal position.

* * * * *